US005986191A

United States Patent [19]
McCabe

[11] Patent Number: 5,986,191
[45] Date of Patent: Nov. 16, 1999

[54] TUNING MEANS FOR FULCRUM TREMOLO

[76] Inventor: Geoffrey McCabe, 36 E. 7th St., New York, N.Y. 10003

[21] Appl. No.: 08/734,346

[22] Filed: Oct. 21, 1996

[51] Int. Cl.[6] .................. G01D 3/00
[52] U.S. Cl. .................. 84/313
[58] Field of Search .................. 84/313

[56] References Cited

U.S. PATENT DOCUMENTS

| | | | |
|---|---|---|---|
| 5,419,227 | 5/1995 | Lavineway | 84/313 |
| 5,522,297 | 6/1996 | Enserink | 84/313 |

*Primary Examiner*—William M. Shoop, Jr.
*Assistant Examiner*—Kim Lockett
*Attorney, Agent, or Firm*—Dann, Dorfman, Herrell & Skillman, P.C.; Stephen H. Eland

[57] ABSTRACT

A stringed musical instrument is provided wherein each string has two critical points. A fulcrum tremolo is mounted on the instrument for varying the tension of the strings and the distance between the two critical points. The strings are attached to a plurality of intonation modules mounted on the fulcrum tremolo. Each intonation module is adjustable so that the strings can be adjusted from an untensioned state to a proper playing pitch. A bearing assembly is also included to facilitate pivoting of the fulcrum tremolo.

32 Claims, 4 Drawing Sheets

TUNING MEANS FOR FULCRUM TREMOLO

BACKGROUND OF THE INVENTION

In a stringed musical instrument, such as a guitar, the strings extend unsupported between a first critical point usually formed by the nut where the neck joins the head and a second critical point usually formed by the bridge positioned on the body. The strings are anchored at one end on a portion of the instrument known as the tailpiece, strung over the bridge and the nut on the head of the instrument and in conventional instruments anchored on the other end to the tuning pegs where an untensioned string is tensioned and adjusted to a tuned condition. The second critical point is formed by a part of the bridge or by a part of a combined bridge and tailpiece structure. Traditionally, the size of the bridge elements are quite small so as to create a clearly defined single point of contact between the string and the bridge element. It is between these two points that the string length is determined. This is sometimes referred to as the scale length. Adjusting the relative distance between the first and second critical points is called harmonic tuning. Some bridges structures have individually adjustable bridge elements for each string. Often, the typical construction of the strings, particularly for guitar and bass, has a plain end and a "ball end" where a washer-like addition is wrapped by the string itself as a means to help secure the string to the instrument at the tailpiece. The wrapping usually extends for at least a ½" towards the plain end and as such the tailpiece structure must insure that the wrapping does not extend over the second critical point when arranged on the instrument. Fine tuning has been a long standing problem for stringed musical instruments.

In the Proelsdorfer U.S. Pat. No. 2,304,597, string tensioning devices placed on the tailpiece for fine tuning the pitch of the strings of violins, guitars and the like, were disclosed, however such pitch adjustment is quite limited in range and designed to offer the tuning of the strings a minor adjustment of pitch after the general tuning is achieved with the tuning pegs on the head of the instrument which in part provides the means for raising and adjusting the tension of the strings to pitch from an untensioned condition.

It is known to those skilled in stringed musical instrument design and construction that various tremolos have been proposed and utilized for varying the tension of all the strings simultaneously for the purpose of creating a tremolo sound. Further, it is known to those skilled in the art that there are a great many commonly used names for such devices, such as tremolo, tremolo device, tremolo tailpiece, tremolo bridge, fulcrum tremolo, fulcrum tremolo bridge, fulcrum tremolo tailpiece, fulcrum tremolo bridge-tailpiece, vibrato, vibrato bridge, vibrato tailpiece, vibrato bridge tailpiece, etc.

The forerunner of one such species, known as the fulcrum tremolo, Fender U.S. Pat. No. 2,741,146, shows and provides a tremolo device which incorporates a novel bridge structure which incorporates the tailpiece which is commonly known to provide the anchoring means for the strings. The bridge plate is also known as the base plate. The base plate upon which the individual bridge elements are adjustably secured has a beveled ridge portion mounted to the instrument body by six screws permitting pivotal movement about a fulcrum axis for varying the tension on the strings and producing the desired tremolo effect. Further, the bridge and the tailpiece both move together as the tremolo device is pivoted. A singular aspect of the fulcrum tremolo is that the harmonic tuning is upset as the device is pivoted.

Typically, when a fulcrum tremolo pivots about its fulcrum axis, counter springs are utilized to counteract the pull of the strings. Counter springs are usually connected to the body of the instrument at one end and to an attachment means on the bottom of the tremolo at the other end. One of the most troublesome problems with prior art has been maintaining the initial tuning at proper playing pitch. When a musician plays on the string there is usually some kind of string stretch over time and, consequently, a lessening of tension that results in the overall tuning going out of balance. Similarly, the use of the tremolo itself may also introduce string stretch. Further, various factors such as the changes in the humidity of the atmosphere causing the wood in the neck and/or body of the instrument to swell often create subtle distortions in the instrument's geometry which would then in turn disturb the equilibrium point between the tension of the strings and the tension of the counter springs and then as a consequence disturb the initial position. Initial position refers to a specific equilibrium point between the tension of the strings and the tension of the counter springs at the intended tuned pitched condition of the strings. Often the pivot means is subject to wear and the tremolo does not always return to its initial position.

Improvements to the Fender U.S. Pat. No. 2,741,146 fulcrum tremolo have included using string clamps at the nut and immediately behind the intonation points on each of the bridge elements to limit string stretch to within these two points that define the scale length and separately adopting a novel beveled edge adjustably supported by two screw-like members positioned in the body at the fulcrum point to improve the return to initial position after pivoting the tremolo device (Rose U.S. Pat. No. 4,171,661). In Rose U.S. Pat. No. 4,497,236 a combination of the bridge element, the tailpiece and fine tuners replaced the "novel bridge structure" incorporating the tailpiece of the Fender device so that within the limited range (typically less than a whole tone) the strings could be re-tuned without unlocking the string clamps at the nut. However, string stretch beyond the range of the fine tuners necessitated a correction that is tedious, and time consuming involving unlocking the string clamps, re-tuning the strings, readjusting the clamp, and re-tuning all the other strings to re-balance the equilibrium point back to initial position.

Therefore, for stringed musical instruments, as is known to those skilled in the art:

- the second critical point is a clearly defined point on the bridge or individual bridge elements, the adjustment of which relative to the first critical point on the nut defines the length of the string or scale length and is called harmonic tuning;

for fulcrum tremolos as originated by Fender U.S. Pat. No. 2,741,146, when pivoted:

- both the bridge portions and the string anchoring means, the tailpiece, simultaneously move about a fulcrum axis;
- there is a tendency for the harmonic tuning to be upset; and
- various factors can disturb the equilibrium point between the tension of the strings and the tension of the counter springs and as a consequence disturb the initial position; and for those fulcrum tremolos equipped with fine tuners as with Rose U.S. Pat. No. 4,497,236, Storey U.S. Pat. No. 4,472,750 and Fender U.S. Pat. No. 4,724,737:

- the fine tuners simultaneously move with the bridge and tailpiece portions about the fulcrum axis when the device is pivoted; and fine tuners are designed to offer the tuning of the strings a minor adjustment of pitch after the general tuning is first achieved by the tuning pegs on the head of the instrument; and for those fulcrum tremolos fitted with string locks at the first and second critical points as in Rose U.S. Pat. No. 4,171, 661, string stretch beyond the clamps at the first and second critical points is eliminated offering the most stability of tuning possible in regards to this set of problems associated with string stretch.

In Steinberger U.S. Pat. No. Re. 31,722 stringed musical instruments without tuning pegs placed in the typical fashion on the head of the instrument were commonly known as "headless" stringed musical instruments. The replacement tuning machines were mounted on the body opposite the side where the neck joins the body.

Takabayashi U.S. Pat. No. 4,608,905 describes an improvement on fulcrum tremolos incorporating, "octave tuners", tuners which function like the tuning pegs at the head of the instrument but which is integrated into the tailpiece function in the tremolo means. The bridge portion of the device comprised a "roller" configuration for the second critical point similar to Storey U.S. Pat. No. 4,742, 750 and Steinberger U.S. Pat. No. 4,704,936. A cylindrical portion adjustably secured to the base plate houses a string holder member for one end of the string which is "fitted in such a manner as to be allowed to move freely in the axial direction". The ball end of each string is arranged to be anchored "to the rear end opening of the string holding members" which is adjustably positionable "in the stretching direction of the strings for effecting octave tuning". The string continues through the string holder member which is sufficient in size to ensure that the wrapping of the ball end does not extend over the second critical point; the string then passes over the bridge element towards the nut. In this device the string holder member accomplishes the tailpiece function by anchoring the string at a single point which moves accordingly when the string holder member is displaced to achieve the tuning of the instrument.

Further improvements in the fulcrum tremolo utilized an arrangement with ball bearings at the pivot point within a housing adjustably mounted to the body which not only improved return to initial position after use of the tremolo but also virtually eliminated the wear and tear associated with prior art (McCabe U.S. patent application Ser. No. 07/607,458, Continuation Ser. No. 08/027,729, filed Jan. 14, 1993).

Additionally, the replacement of fine tuners with macro-tuners on a fulcrum tremolo (McCabe U.S. patent application Ser. No. 07/607,458, Continuation Ser. No. 08/027,729, filed Jan. 14, 1993) provided an intonation module that included a novel integrated one piece bridge-tailpiece structure secured to the base plate where each string anchored within its respective structure passes through a separate lever member and over the bridge element wherein the lever member could be displaced by an adjustment bolt to provide the means to bring and adjust the strings to playing pitch from an untensioned condition circumventing the retuning limits imposed by the fine tuner arrangements. These macro-tuners are often part of an intonation module dedicated to each string for use with but not exclusive to "headless" stringed musical instruments, that is, instruments without tuning pegs placed in the typical fashion on the head of the instrument. Certainly, a fulcrum tremolo with macro-tuners could be used with instruments which had tuning pegs without a disadvantage. Further, macro-tuners could be placed on the head or the body of the instrument and if integrated with a string anchoring means could replace the tuning pegs.

Macro-tuners refer to tuners with the capacity to raise and adjust the tension of the strings from an untensioned condition to a proper playing pitch, and as such provide for alternate tunings and compensation for substantial string stretch during the life of the string essentially without additional means.

Often the musician is called upon to play in an ensemble where the other instruments are not tuned to a typical concert pitch. Accordingly, the musician must flatten or sharpen the initial tuning of all the strings on his instrument in order to meet the pitch requirements of other instruments. This retuning often disturbs the initial position because the tension of the counter springs has not been readjusted as well. Accordingly, the position of the base plate of the tremolo is either tilting away from or towards the body of the instrument which then can limit the range in which the tremolo can be activated. Steinberger U.S. Pat. No. 4,632,005 and Gunn U.S. Pat. No. 4,955,275 provide for an adjustable counter spring and utilize an adjustment knob that provides a means to vary tension of the counter spring and thereby maintain the equilibrium point between the tension of the counter spring and the tension of the strings on fulcrum tailpiece tremolo, that is, a tremolo device where the bridge elements do not pivot with the anchoring means and, therefore, do not upset the harmonic tuning as such. There is no prior art for this type of arrangement on a fulcrum tremolo.

An alternate means to tuning pegs on the head of the instrument has been proposed in a quick tuner arrangement design (McCabe U.S. patent application Ser. No. 07/607, 458) wherein the tuning device, now known to those skilled in the art as a "semi-headless tuner", has the capacity to individually anchor and bring the strings to playing pitch and then accomplishing the fine tuning. The primary tuning means is afforded by a forceps-like clamp at one end of a L-shaped arm with a plurality of "teeth" engaged with "teeth" on a holding bracket. This arrangement provides for a variety of locking positions that correspond to a variety of pre-set tuned conditions for the associated strings secured to the opposite end of the L-shaped arm. The secondary tuning means or fine tuning is provided by a small thumb screw adjacent the point where the string is secured to the L-shaped arm, however, this arrangement is subject to premature string breakage and a limited range.

Additionally, these improvements listed above are characterized by a number of other defects or limitations which will now be briefly indicated. The ball bearing means (McCabe U.S. patent application Ser. No. 07/607,458, Continuation Ser. No. 08/027,729, filed Jan. 14, 1993) for adjustably mounting the fulcrum tremolo to the instrument body are arranged in a bearing housing supported within a fork-like structure in the base plate. This placement of the bearing arrangement is often then too close to the pickups and prevents installation on some instruments. Further, for instruments being built to receive this design, the typical placement of the pick-up in relation to the second critical point is disturbed and may affect the tonal character of the instrument in an undesirable manner. Further, the fork-like portion that holds each bearing housing is delicate and is subject to breakage.

The design of the macro-tuners (McCabe U.S. patent application No. 07/607,458, Continuation Ser. No. 08/027, 729, filed Jan. 14, 1993) requires the string to be bent severely to achieve the necessary tuning. This arrangement makes tuning at the higher pitches difficult and in some cases may introduce string breakage.

The "octave tuners" of the Takabayashi fulcrum tremolo U.S. Pat. No. 4,608,905 anchor the strings at a point on the string holder member spaced on the opposite side from the second critical point on the bridge elements. This arrangement presents serious problems:

the length of the string subject to stretch beyond scale length, which includes the additional string length as measured from the bridge element to the anchoring point, is excessive in general practice at initial position and is far more so when the device is pivoted as would be seen in view of the improvements made by Rose U.S. Pat. No. 4,171,661 and, the tensioning of the strings which holds the ball end of the string securely against the outer opening of the string holding member is inadequate to keep the ball ends as seated throughout the performance range of the tremolo; such mis-seatings are devasting to the effort to maintain a tuned fulcrum tremolo.

SUMMARY OF THE INVENTION

Accordingly, the primary object of this invention is to provide improvements in the mounting means of the bearing and bearing housing arrangement for pivotally supporting the base plate of the fulcrum tremolo that will allow a greater range of installation possibilities.

It is a further object of the invention to provide the intonation modules with macro-tuners integrated with a string anchoring means, known to those skilled in the art as a tailpiece. The intonation modules each include a separate string tensioning element that functions to secure the string adjustably to the fulcrum tremolo. This string tensioning element is in threaded engagement with an adjustment bolt for positioning relative to the second critical point for accomplishing the macro-tuning. The string tensioning element includes a fork-like string clamping means in bearing contact with a restricted portion within the a sleeve-like portion of the intonation module structure that remains stable through the full range of the tremolo and secures the string as close as possible to the second critical point in order to limit the length of string that would otherwise be subject to stretch. By threading the adjustment bolt, the string tensioning element is displaced simultaneously:

increasing the tension of the associated string to a proper pitched condition and varying the tension of the string thereof so as to provide the macro-tuning function, and drawing the fork-like string clamping means of the string tensioning element within the restricted portion of a sleeve-like portion of the intonation module structure, compressing and closing the forks upon the string at the clamping point for transferring the anchoring of the string to an improved anchoring means positioned at the end of the string tensioning element closest to the second critical point.

Yet, another object of the invention is to provide a global tuning mechanism on the fulcrum tremolo which would compensate for the problems associated with varying humidity on the instrument as well as other factors that could affect the instrument's geometry. Further, a global tuner would also provide a simple and quick means for the musician to adjust the initial position in order to meet the pitch requirements in varied situations. Further, the global tuner in reestablishing the initial position allows the full range of pivoting the tremolo in either direction. Global tuners refer to a means on a fulcrum tremolo with the capacity to adjust the equilibrium point between tension of the counter spring(s) and the tension of the strings in order to compensate for changes in tension on the strings or the counter springs. The global tuner employs a thumb screw-like means with an additional reverse-threaded shaft on the opposite side of the thumb wheel; one side one of the two shafts is threadedly engaged with the spring attachment means on the tremolo and the other of the two shafts is similarly engaged with a separate counter spring holder. The counter springs are attached to the body as in prior art on one end and to the separate spring holder on the other. When the thumb screw is threaded the relative distance between the spring attachment means on the base plate of the tremolo and the attachment point of the springs to the body can be adjusted, thereby varying the tension of the counter springs in order to compensate for the variations in tension of the strings associated with redefining or reestablishing the initial position.

Another object of the invention is to replace the fine tuner portion on each of the L-shaped arms of the "semi-headless tuners" with an additional macro-tuner mechanism and, therefore, provide for greater range and easier use. This advancement for adjustably securing each string to a improved clamping means positioned within a sleeve-like portion on one end of a L-shaped arm provides the capacity to tune the string from an tensioned condition to pitched string condition. As in prior art each L-shaped arm can pivot and be selectively positioned to a number of pre-set positions relative to the nut or first critical point for raising from an untensioned to a pre-set pitched string condition. A variant of this arrangement eliminates the L-shaped arm and positions a plurality of macro-tuners integrated with a string anchoring means at the nut wherein the clamping means is positioned at the first critical point to eliminate string length that would be otherwise subject to stretch as compared to those found in conventional tuning peg arrangements.

The various features of novelty which characterize the invention are pointed out with particularity in the claims annexed to and forming a part of this disclosure. For a better understanding of the invention, its operating advantages and specific objects attained by its use, reference should be had by the accompanying drawings and descriptive matter in which there are illustrations and described preferred embodiments of the invention.

BACKGROUND OF THE INVENTION

DETAILED DESCRIPTION OF THE INVENTION

Figure 1:
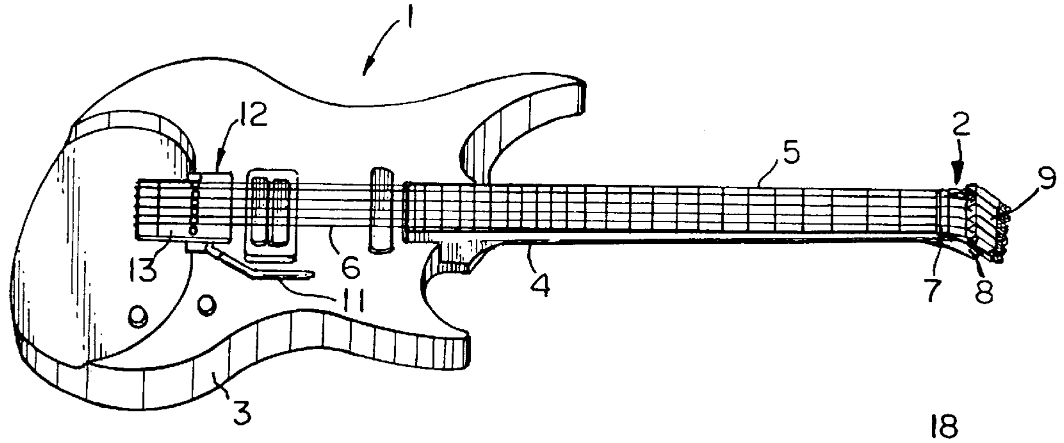
FIG. 1 is a plan view of an electric guitar embodying the present invention.

In FIG. 1, an electric guitar 1 is illustrated comprising a head 2 at one end, a body 3 at the other end, with a neck 4 extending between the head and the body. Six strings 6 extend from head 2 to body 3 over neck 4. Neck 4 forms fret board 5 for guitar 1. At head 2, each of the strings extends over nut 7 forming the first critical point for the strings. Nut 7 is located at the transition of neck 4 to head 2. Each string 6 is secured on the head by anchor 8 and each anchor has a corresponding tuner 9. On the body 3, strings 6 are secured to fulcrum tremolo 12. Fulcrum tremolo 12 has arm 11 for pivoting the tremolo and providing the vibrato effect on the strings. Fulcrum tremolo 12 has six intonation modules 13. The intonation modules present improvements to the macro-tuning invention which incorporates the function of the bridge element and tail-piece in its structure as well as the capacity to adjustably secure the individual strings to the instrument. The intonation modules are movable and thereby provide a means to change the distance between the first and second critical points or the harmonic tuning as such.

The invention is shown for us on electric guitar 1 and it should be understood that the invention could be used on a variety of stringed musical instruments.

In body 3 of guitar 1 there are electric pickups.

In the following description, fulcrum tremolo 12 will be described in greater detail.

Fulcrum tremolo 12 forms a second critical point for strings 6, sometimes characterized as an intonation point or bridge point.

Figure 2:
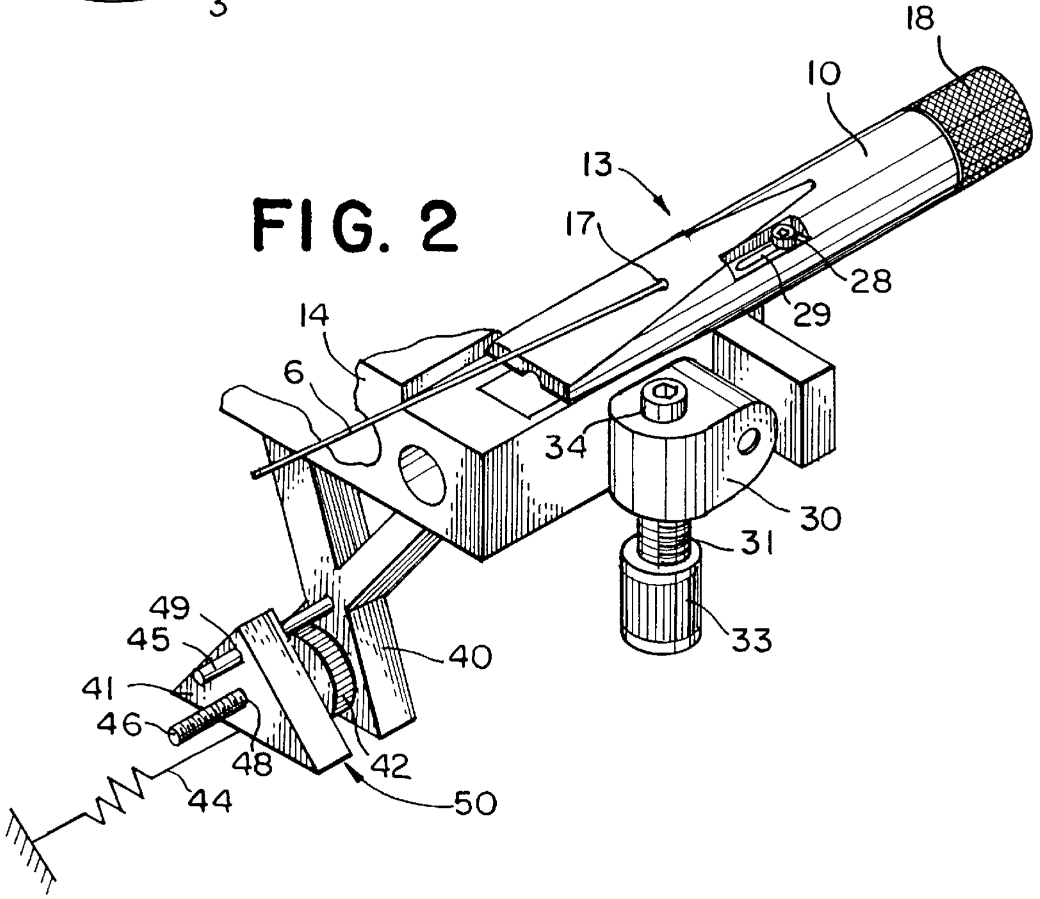
FIG. 2 is a perspective view of the macro-tuners, bearing mounting arrangement and global tuner of the present invention as used in the electric guitar.
Figure 3:
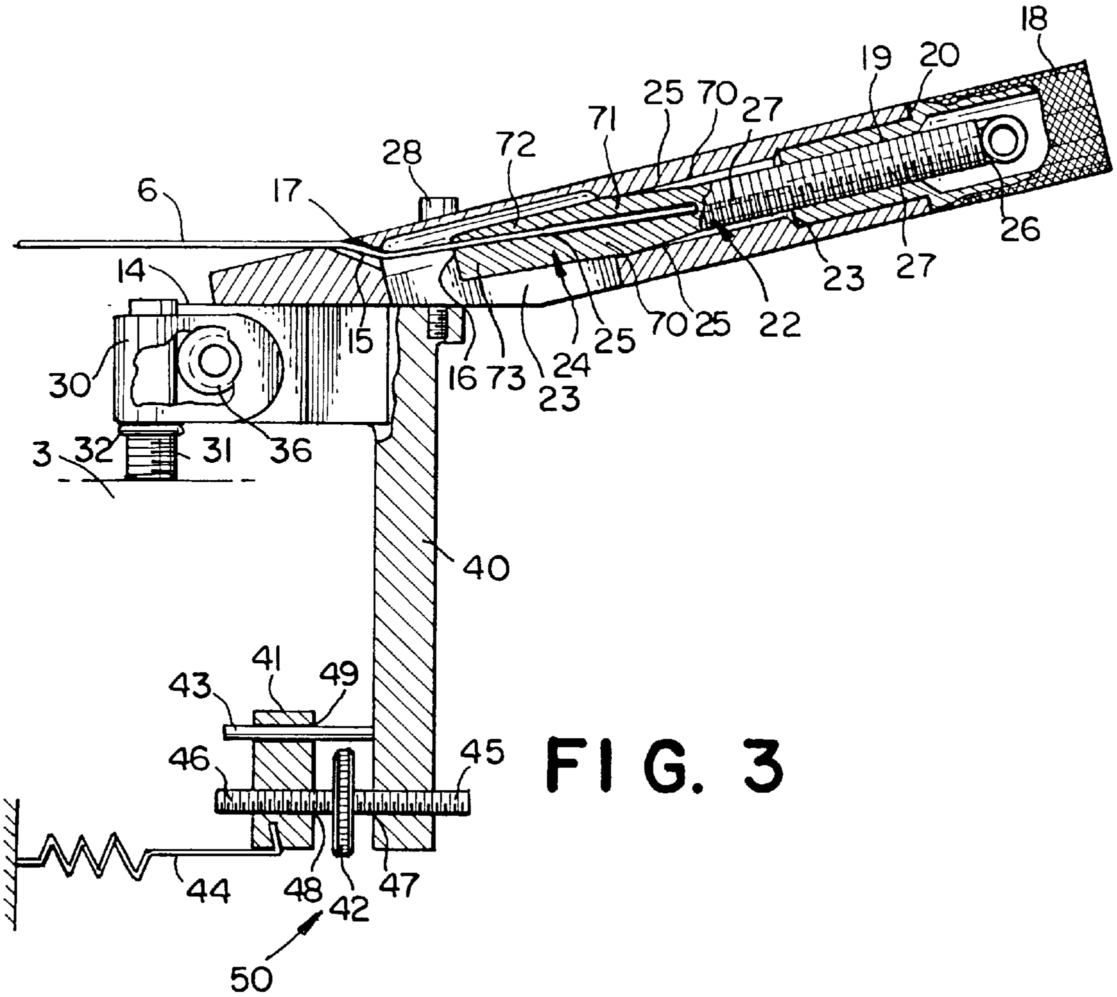
FIG. 3 is a side view cross-section of the tremolo mechanism showing the macro tuners, bearing mounting arrangement and the global tuner.
Figure 4:
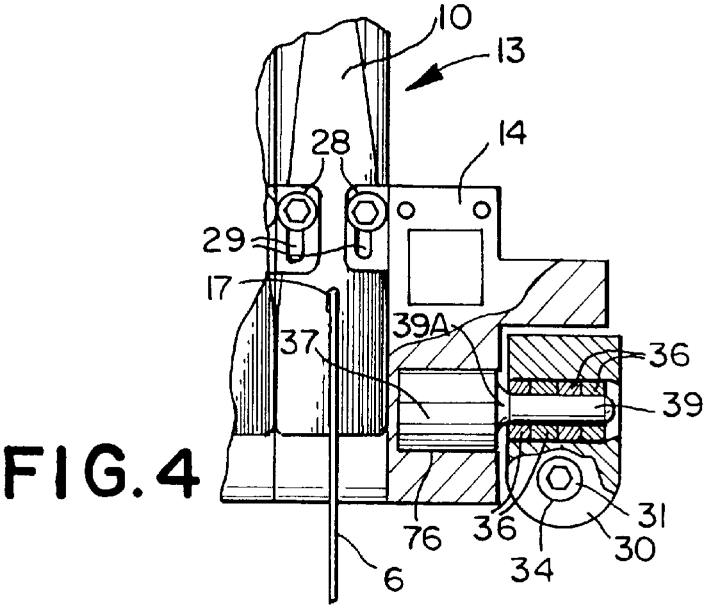
FIG. 4 is a top view cross-section of the ball bearings, the housing mounting means.
Figure 5:
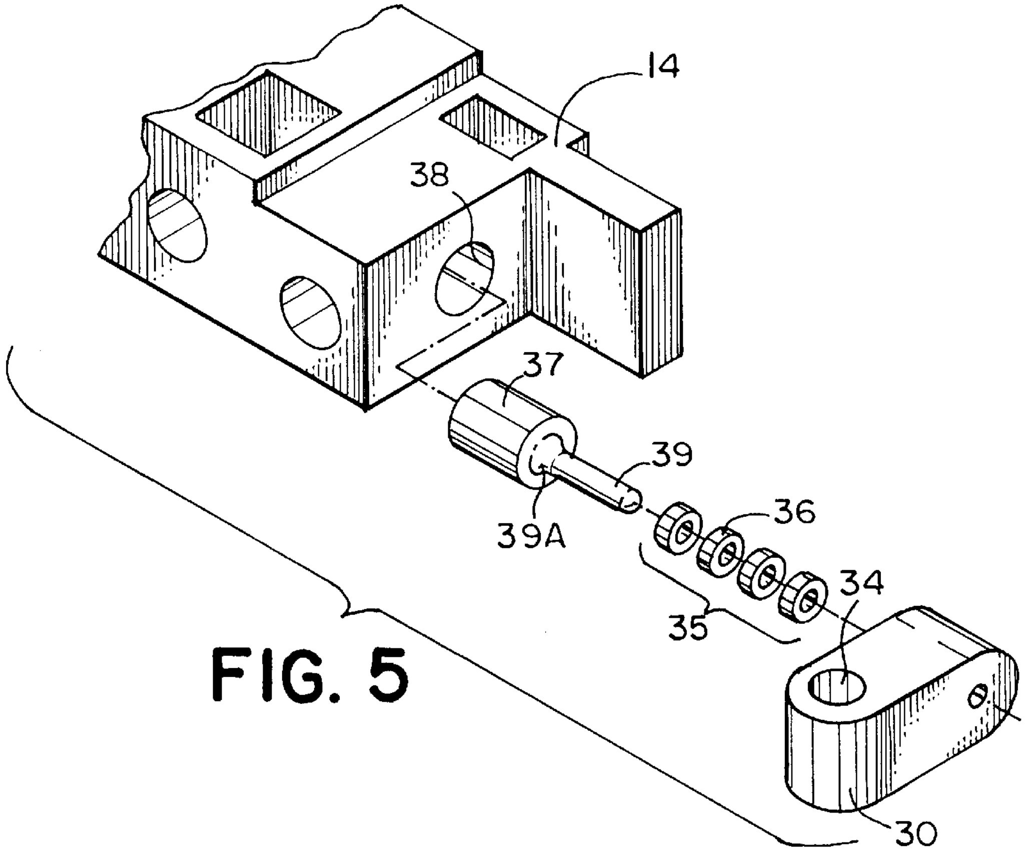
FIG. 5 is an exploded perspective view of the bearing ball bearings, the housing mounting means.

In FIG. 2, fulcrum tremolo 12 is shown on an enlarged scale compared to FIG. 1. FIG. 3 displays fulcrum tremolo 12 of FIG. 2 in a cross-section view. The second critical point is located near the front intonation modules 13. Outwardly from intonation modules 13 on each side of the opposite sides of base plate 14 extending in the direction of the strings there are bearing housings 30. The bearing housing 30 supports base plate 14 pivotally relative to body 3. Global tuner 50 is positioned between spring block 40 extending downwardly from the bottom of base plate 14 and counter springs 44 connected to instrument body 3.

In FIGS. 2 and 3, one of the intonation modules 13 is shown including a shaped barrel-like base 10 with a second critical point formed at string opening 17. Base 10 is adjustably secured to base plate 14 of fulcrum tremolo 12 by machine screws 28 through slots 29. Loosing machine screws 28 permits longitudinal movement of base 10 and associated parts for harmonic tuning of string 6. Adjustment bolt 18 first passes through opening 20 in base 10 and threaded portion 19 of adjustment bolt 18 is engaged with threaded portion 21 of string tensioning element 22 within sleeve-like portion 23 of base 10. String 6 of the musical instrument makes critical contact with base 10 at the string opening 17 to passageway 15 sloping downwardly and rearwardly through base 10 until the string passes into a sleeve-like portion 23. String 6 continues passing through clamping point 16 of string tensioning element 22, through slots 25 between upper fork 72 and lower fork 73 of fork-like string clamping means 24, through string passageway 27 of string tensioning element 22 and is secured at exit 26. Annular flange-like portion 71 of fork-like string clamping means 24 of string tensioning element 22 is in bearing contact with restricted portion 70 of sleeve-like portion 23 of base 10. Threading adjustment bolt 18 displaces the string tensioning element 22 relative to string opening 17 providing an adjustment whereby tension or pull on string 6 is applied and varied for raising and adjusting the strings 6 from an untensioned condition to a pitched string condition; simultaneously, annular flange-like portion 71 of fork-like string clamping means 24 of string tensioning element 22 is drawn within restricted portion 70 of sleeve-like portion 23, clamping string 6 between upper fork 72 and lower fork 73 at clamping point 16 adjacent to string opening 17.

In FIGS. 2, 3, 4 and 5 outwardly from intonation modules 13 on each side of the opposite sides of base plate 14 shown at the forward end of fulcrum tremolo 12 extending in the direction of the strings, there is bearing housing 30. Bearing housing 30 is adjacent to base plate 14. Housing 30 is adjustably supported relative to body 3 of the instrument by threaded post 31 with annular flange 32. Post 31 is threaded into insert 33 in body 3. By threading post 31 into insert 33, the spacing between body 3 and housing 30 is selectively adjustable. Adjustment of post 31 is effected through an oval opening 34 in the top of housing 30. In housing 30 rearward post 31, there is opening 76 extending transversely of the string direction of guitar1 containing bearing assembly 35, formed by four side-by-side roller bearings 36. Insert 37 fits into cut-out 38 in the side of base plate 14 with pin 39 with annular flange 39*a* extending outwardly through bearings 36. Annular flange 39*a* on pin 39 spaces the side-by-side roller bearings 36 from base plate 14. Accordingly, by manipulating tremolo arm 11, fulcrum tremolo 12 can be pivoted about pin 39 to achieve the desired tremolo effect.

As can be seen in FIGS. 2 and 3 there is spring attachment means 40 extending downwardly from base plate 14. The preferred embodiment incorporates thumb screw 42 with shaft 45 threadedly engaged with threaded opening 47 in spring block 40 on one side of thumb screw 42 and another shaft 46 with reverse threads in the opposite direction of shaft 45 threadedly engaged with reverse threaded opening 48 in spring holder 41. Counter springs 44 are attached at one end to spring holder 41 and to body 3 on the other end of counter springs 44. Guide pin 43 extending outwardly from spring block 40 towards spring holder 41 passes through guide pin opening 49 in spring holder 41 limiting longitudinal rotational movement of spring holder 41 relative to spring block 40. By threading thumb screw 42 clockwise relative to spring holder means 41, spring holder 41 moves closer to spring block 40 increasing the tension of the counter springs 44 and by threading thumb screw 42 counter-clockwise relative to spring holder means 41, spring holder 41 moves away from spring block 40 decreasing the tension of the counter springs 44 providing the means to adjust the equilibrium point and globally tune fulcrum tremolo 12.

Figure 6:
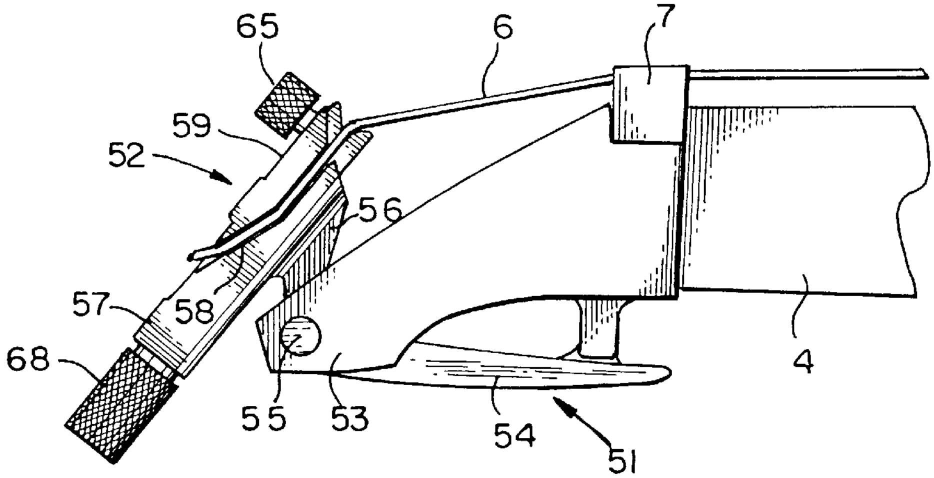
FIG. 6 is a side view of the "semi-headless tuners" with two macro-tuning means.

FIG. 6 displays an improved "semi-headless" tuner arrangement for stringed musical instruments.

Figure 7:
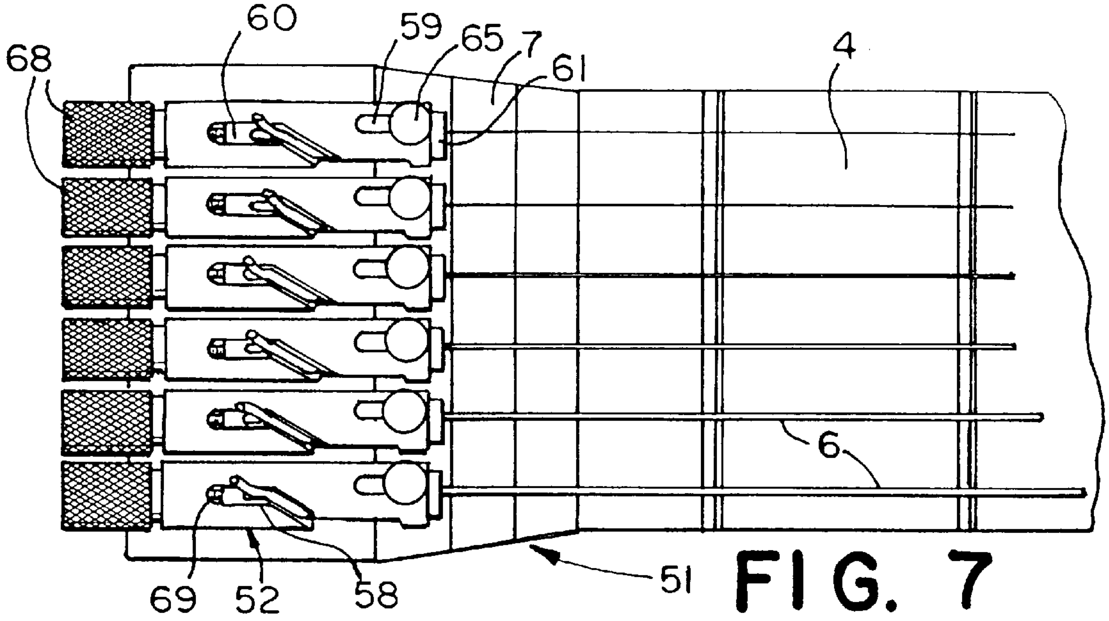
FIG. 7 is a top view of the "semi-headless tuners" arranged on the neck of the guitar adjacent the nut.

In FIG. 7, at the end of 4 is shown with strings 6 each of a different size. The strings 6 pass over nut 7 and each string is secured by string tensioning tuning device 51, a "semi-headless tuner" adjacent the nut. There is a separate macro-tuning device 52 for each string.

The devices, as set forth in FIGS. 6 & 7 includes bracket 53 secured to and projecting from the end of neck 4. L-shaped lever 54 is pivotally connected by pin 55 as shown in FIG. 6. The other or second arm 56 of lever 54 extends from pivot pin 44 toward the end of neck 4.

At the end of second arm 56 there is sleeve-like portion 57. String slot 58 extends longitudinally along sleeve-like portion 57 continuing disposed at an angle towards the top of the sleeve. Slot 59 at the free end of the sleeve extends towards the connected end of second arm 56.

Adjacent the free end and within sleeve-like portion 57, there is string clamping means 60 with fork-like portion 61 with upper fork 62 and lower fork 63 and at the opposite end there is threaded opening 64. Thumb screw 65 passes through slot 59 in sleeve-like portion 57 and through unthreaded opening 66 in upper fork 62 and is threadedly engaged with threaded opening 67 in lower fork 63. String 6 is arranged through slotted opening 58 and into slotted opening 75 between upper fork 62 and lower fork 63. Threading thumb screw 65 clamps the upper fork 62 and lower fork 63 on string 6, securing string 6 to string clamping means 60.

Adjustment bolt 68 is adjustably mounted within sleeve-like portion 57 opposite the free end. Threaded portion 69 of adjustment bolt 68 is threadedly engaged with threaded opening 64 adjustably securing string clamping means 60 to macro-tuner 52. By threading adjustment bolt 68 the clamping means can be displaced relative to nut 7 wherein the tension on string 6 can be raised and varied whereby the macro tuning can be achieved.

Figure 8:
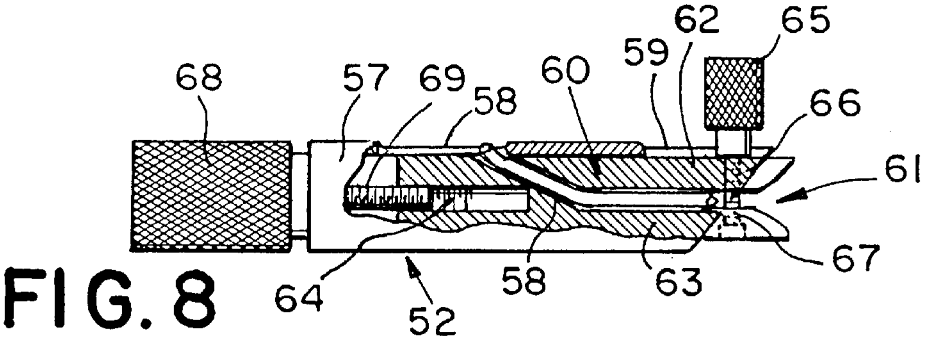
FIG. 8 is a cross-section view of the side of a macro-tuning mechanism.

In FIG. 8, shows a single macro-tuning device where string 6 passes through slots 58 of sleeve-like portion 57 and is arranged between upper fork 62 and lower fork 63 of fork-like portion 61 of string clamping means 60 and clamped and secured by thumb screw 65 wherein threaded portion 69 of adjustment bolt 68 is threadedly engaged with threaded opening 64 of string clamping means 60. By threading adjustment bolt 68 the position of string clamping means 60 relative to the anchoring means at the opposite end string 6 is increased and varied whereby tension or pull on string 6 is applied and varied for raising and adjusting the strings 6 from an untensioned condition to a pitched string condition.

While specific embodiments of the invention have been shown and described in detail to illustrate the application of the inventive principles, it will be understood that the invention may be embodied otherwise without departing from such principles.

I claim:

1. Tuning apparatus for a stringed musical instrument comprising a body and a neck extending outwardly from said body, a plurality of strings extending from said body to said neck, means for forming a first critical point for each of said strings on said neck, means for forming a second critical point for each of said strings on a fulcrum tremolo, said fulcrum tremolo includes a base plate, said base plate being pivotally mounted about a fulcrum axis extending transversely of said strings for changing the pitch of all said strings at one time as said base plate is pivoted, separate means for mounting each of said strings on said base plate and for raising and adjusting the tension of said strings from an untensioned condition to a proper playing pitch including means for varying the spacing between said first and second critical points for changing the harmonic tuning, wherein the improvement comprises that each of said separate means for mounting each of said strings has a bridge element forming said second critical point and a string tensioning means on opposite side of said bridge element from said first critical point disposed in a variably spaced relation to said second critical point over which each of said string extends.

2. Apparatus as set forth in claim 1 wherein said separate means has a sleeve-like member, said sleeve-like member has a first portion closer to said second critical point and a second portion more remote from said second critical point, said sleeve-like member includes a restricted interior portion between said first and second ends thereof, said string tensioning means has a first end closer to said bridge element and a second end more remote from said bridge element, said string tensioning means is displaceable between a first limiting position and a second limiting position and the first end of said string tensioning means is in spaced relation from said bridge element in and between said first and second limiting positions.

3. Apparatus as set forth in claim 2 wherein string tensioning means has a string passageway extending from the first end thereof toward the second end, said string arranged to extend through said string passageway and secured to said string tensioning means at said second end.

4. Apparatus as set forth in claim 3 wherein said string tensioning means has a threaded portion extending in the direction of the first end from said second end of said string tensioning means, said string tensioning means has a string clamping means extending from said first end of said string tensioning means towards said threaded portion, and said string tensioning displacement means comprising an bolt-like member adjustably mounted in said separate means and arranged to threadedly engage said string tensioning means for displacing said string tensioning means between said first and second limiting positions.

5. Apparatus as set forth in claim 4 wherein said string clamping means has a fork-like slotted string passageway extending from said threaded portion to said first end of said string tensioning means, said string clamping means including a clamping point at first end of said string tensioning means, said fork-like slotted string passageway has a lower fork closer to said base plate and an upper fork more remote from said base plate, said string clamping means has a annular flange-like portion in bearing contact with said restricted interior portion of said sleeve-like member, said string arranged to extend through said string passageway between said upper and lower forks, wherein as said string tensioning means is displaced in and between said first and second limiting positions for macro-tuning said string, said upper and lower forks are simultaneously displaced towards said string within said restricted interior portion for anchoring said string at said clamping point.

6. A stringed musical instrument comprising an elongated neck and body attached to one end of the said neck, a tremolo device mounted on said body, a plurality of elongated strings, means on said neck for supporting and forming a first critical point for each of said strings, said tremolo device forming a support for and second critical point for each of said strings, said tremolo device comprising a fulcrum tremolo, said fulcrum tremolo including bearing means mounted on said body and supporting said fulcrum tremolo for pivotal displacement, said bearing means comprises at least one ball bearing and at least one bearing housing for adjustably positioning said bearing means relative to said body and at least one shaft is connected to said base plate through said ball bearing wherein the improvement comprises an annular flange on said shaft which spaces said bearing means away from said base plate.

7. A stringed musical instrument comprising an elongated neck and body attached to one end of the said neck, a fulcrum tremolo mounted on said body, a plurality of elongated strings, means on said neck for supporting and forming a first critical point for each of said strings, said fulcrum tremolo forming a support for and second critical point for each of said strings, said fulcrum tremolo including counter springs with a first end and a second end, said first end of said counter springs connected to said body and said second end of said counter springs connected to an attachment means on said fulcrum tremolo for counter balancing the tension of said elongated strings wherein the improvement comprises that said attachment means includes a separate means for globally tuning said fulcrum tremolo.

8. Apparatus as set forth in claim 7 wherein said separate means comprises a spring holder means disposed in spaced relation between said first end of said counter springs and said attachment means.

9. Apparatus as set forth in claim 8 wherein said spring holder means is displaceable between a first limiting position and a second limiting position and said spring holder means is in spaced relation from said attachment means in and between said first and second limiting positions.

10. Apparatus as set forth in claim 9 wherein said attachment means has a threaded passageway extending in the direction of said spring holder means, said spring holder means has a threaded passageway extending in the direction of said counter springs and an unthreaded passageway extending in the direction of said attachment means, and said string holder displacement means comprises a thumb screw-like member arranged with a first threaded portion extending in the direction of said counter springs and a second threaded portion extending in the direction of said attachment means.

11. Apparatus as set forth in claim 10 wherein said first threaded portion of said thumb screw-like displacement means is threadedly engaged with said threaded passageway of said spring holder means and said second threaded portion of said thumb screw-like displacement means is threadedly engaged with said threaded passageway of said attachment means for displacing said string holder means in and between said first and second limiting positions.

12. Apparatus as set forth in claim 11 wherein said attachment means has a pin extending in the direction of said spring holder means and said pin passes through said unthreaded opening of said spring holder means for limiting the rotation of said spring holder means about said thumb screw-like displacement means.

13. In a stringed musical instrument, means for locking and tensioning at least one string from an untensioned condition to a tuned pitched condition at one end of the neck of a stringed musical instrument, said means comprising a string locking means for said at least one string, a bracket secured to said one end of said neck, a lever pivotally secured to said bracket, said string locking means secured to said lever, said lever is L-shaped comprising a first lever arm extending angularly from a second lever arm and said lever arms secured together at an intersecting section and a pivot pin extending through said intersecting section and said bracket for pivoting and securing said lever to said bracket, a locking clamp for adjustably securing said second lever arm to said bracket, said first lever arm has a free end spaced from said intersecting section, wherein the improvement comprises that said first lever arm includes an string holder means for securing and macro-tuning said at least one string.

14. A tuning apparatus for a stringed musical instrument, a plurality of strings extending over said stringed musical instrument, each of said strings having a first end and a second end, each of said first end of said strings having a first anchoring means on a first section of said stringed musical instrument and each of said strings having a second anchoring means on a second section of said stringed musical instrument, separate means for raising and adjusting the tension of at least one string from an untensioned condition to a tuned pitched condition, wherein the improvement comprises that said separate means has a string securing means including said first anchoring means for macro-tuning said at least one string.

15. Apparatus as set forth in claim 14, wherein said string securing means has a first end closer to said second anchoring means and a second end further to said second anchoring means, said string securing means is displaceable between a first limiting position and a second limiting position and the first end of said string securing means is in spaced relation from said second anchoring means and in between said first and second limiting positions.

16. Apparatus as set forth in claim 15 wherein each said separate means includes a sleeve-like member with a first section closer to said second anchoring means and a second section closer said second anchoring means, said first end of said string securing means has a string passageway closer to said second anchoring means extending in the direction between said first and second ends thereof, said string securing means has a threaded portion further from said second anchoring means extending in the direction between said first and second ends thereof, and said string securing displacement means comprising an bolt-like member adjustably mounted in said sleeve-like member and arranged to threadedly engage said string securing means for displacing said string securing means in and between said first and second limiting positions.

17. Apparatus as set forth in claim 16, said sleeve-like member has a first slot arranged in said first section thereof, a first side of said sleeve-like member associated with said first slot, said string securing means has a fork-like string passageway extending from said first end thereof towards said second end of said string securing means, said fork-like string passageway means has a upper fork closer to said first slot and an lower fork more remote from said first slot, said upper fork has an unthreaded passageway transverse the direction of said fork-like passageway, said lower fork has a threaded passageway transverse the direction of said fork-like passageway, said upper and lower forks are displaceable between an open position and a closed position.

18. Apparatus as set forth in claim 17, wherein said upper and lower fork displacement means comprising a thumb screw-like member adjustably arranged to pass through said first slot of said sleeve-like member, through said unthreaded passageway of said upper fork and threadedly engage said threaded passageway of said lower fork for displacing said upper and lower forks in and between said open and closed positions towards said string for clamping and securing said at least one string.

19. Apparatus as set forth in claim 18, wherein said sleeve-like member has a second slot extending from said first section of said sleeve-like member towards said second section thereof adjacent said fork-like string passageway and continuing disposed at an angle towards said first side of said sleeve-like member associated with said first slot wherein said at least one string is arranged to extend through said second slot and into said fork-like string passageway between said upper and lower forks.

20. Apparatus as set forth in claim 13 wherein string holder means for securing and macro-tuning said at least one string is said string securing means for macro-tuning said at least one string as set forth in claim 14.

21. Apparatus as set forth in claim 16, wherein said sleeve-like member includes a restricted portion between first and second section thereof, said string securing means has a string passageway extending from the first end thereof toward the second end, said string arranged to extend through said string passageway and secured to said string securing means, said string securing means includes a string clamping means, said string clamping means in and between said first and second ends of said string securing means, said string clamping means has a fork-like slotted string passageway extending from said threaded portion to said first end of said string securing means, said string clamping means including a clamping point at first end of said string securing means, said fork-like slotted string passageway has a first fork and second fork, said string clamping means has a annular flange-like portion in bearing contact with said restricted portion of said sleeve-like member, said string arranged to extend through said string passageway and between said first and second forks, wherein as said string clamping means is displaced in and between said first and second limiting positions said first and second forks are displaced within said restricted portion of said sleeve-like member for securely clamping said string at said clamping point.

22. Apparatus as set forth in claim 18 is part of a tremolo device wherein said first end of said string securing means is adjacent to said second critical point.

23. A tremolo operable with a musical instrument having a body and a plurality of strings in a tensioned state connected to the body, the tremolo comprising:

a based mounted to the body, pivotable about a fulcrum axis, wherein the tension in the strings tends to pivot the base in a first direction about the fulcrum axis;

a tremolo arm operable to pivot the base about the fulcrum axis to create a tremolo effect;

a biasing element connected to the body wherein the biasing force of the biasing element tends to pivot the base in a second direction against the tendency of the base to pivot the base in a first direction in response to the tension in the strings; and an adjustment mechanism disposed between the biasing element and the base, operable to adjust the biasing force of the biasing element.

24. The device of claim 23 wherein the base includes an elongated arm and the adjustment mechanism operates to vary the distance between the arm and the biasing element.

25. The device of claim 23 comprising a block connected to the biasing element and an elongated arm connected to the base, wherein the adjustment mechanism threadedly engages at least one of the block and the elongated arm.

26. The device of claim 24 comprising an alignment element operable to impede rotation of the block in one direction relative to the elongated arm.

27. A tremolo operable with a musical instrument having a body and a plurality of strings in a tensioned state, connected to the body, the tremolo comprising:

a based mounted to the body, pivotable about a fulcrum axis, wherein the tension in the strings provide a force in a first direction that tends to pivot the base in a first direction about the fulcrum axis;

a tremolo arm operable to pivot the base about the fulcrum axis to create a tremolo effect;

a counter balance producing a force in a second direction to counter balance the string tension force to establish an equilibrium point of rotation of the base;

an adjustment mechanism operable to adjust the equilibrium point of rotation of the base.

28. The device of claim 27 wherein the adjustment mechanism varies the counter balance force.

29. The device of claim 27 wherein the base includes an elongated arm and the adjustment mechanism operates to vary the distance between the arm and the counter balance.

30. The device of claim 27 comprising a block connected to the biasing arm and an elongated arm connected to the base, wherein the adjustment mechanism threadedly engages at least one of the block and the elongated arm.

31. The device of claim 29 comprising an alignment element operable to impede rotation of the block in one direction relative to the elongated arm.

32. A tremolo operable with a musical instrument having a body and a plurality of strings in a tensioned state, connected to the body, the tremolo comprising:

a base mounted to the body, pivotable about a fulcrum axis;

a tremolo arm manually operable to pivot the base about the fulcrum axis to produce a tremolo effect;

a tuning element connected with the base operable to simultaneously vary the tension in each of the strings.

* * * * *

US005986191C1

(12) EX PARTE REEXAMINATION CERTIFICATE (8962nd)

United States Patent

McCabe

(10) Number: US 5,986,191 C1

(45) Certificate Issued: Apr. 17, 2012

(54) TUNING MEANS FOR FULCRUM TREMOLO

(76) Inventor: Geoffrey McCabe, New York, NY (US)

Reexamination Request:
No. 90/011,377, Dec. 7, 2010

Reexamination Certificate for:

Patent No.: 5,986,191
Issued: Nov. 16, 1999
Appl. No.: 08/734,346
Filed: Oct. 21, 1996

(51) Int. Cl.
*G10D 3/00* (2006.01)
*G10D 3/14* (2006.01)

(52) U.S. Cl. ........................................................ 84/313

(58) Field of Classification Search ........................ None
See application file for complete search history.

(56) References Cited

To view the complete listing of prior art documents cited during the proceeding for Reexamination Control Number 90/011,377, please refer to the USPTO's public Patent Application Information Retrieval (PAIR) system under the Display References tab.

*Primary Examiner*—Jason Proctor

(57) ABSTRACT

A stringed musical instrument is provided wherein each string has two critical points. A fulcrum tremolo is mounted on the instrument for varying the tension of the strings and the distance between the two critical points. The strings are attached to a plurality of intonation modules mounted on the fulcrum tremolo. Each intonation module is adjustable so that the strings can be adjusted from an untensioned state to a proper playing pitch. A bearing assembly is also included to facilitate pivoting of the fulcrum tremolo.

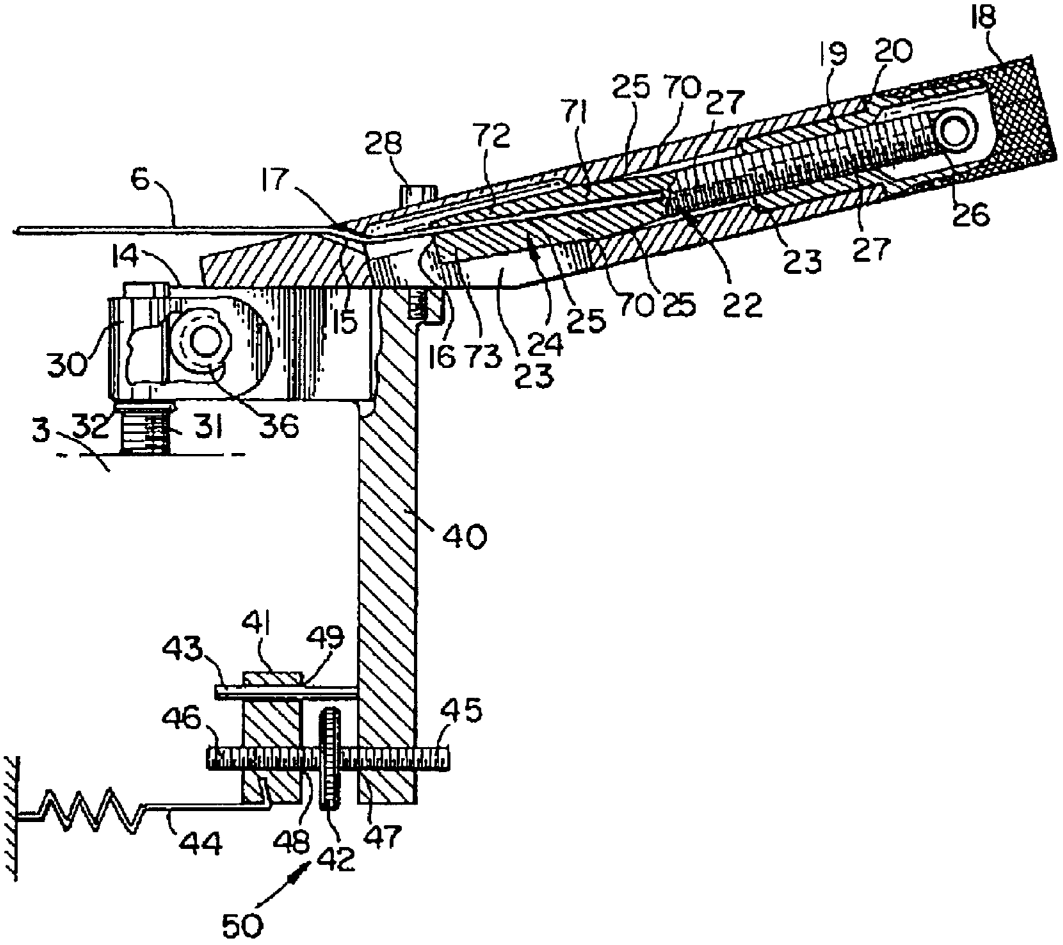

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5, 14, 17, 21 are determined to be patentable as amended.

Claims 2-4, 15, 16, 18, 19, 22 dependent on an amended claim, are determined to be patentable.

Claims 6-13, 20, 23-32 were not reexamined.

1. Tuning apparatus for a stringed musical instrument comprising a body and a neck extending outwardly from said body, a plurality of strings extending from said body to said neck, means for forming a first critical point for each of said strings on said neck, means for forming a second critical point for each of said strings on a fulcrum tremolo, said fulcrum tremolo includes a base plate, said base plate being pivotally mounted about a fulcrum axis extending transversely of said strings for changing the pitch of all said strings at one time as said base plate is pivoted, separate means for mounting each of said strings on said base plate and for raising and adjusting the tension of said strings from an untensioned condition to a proper playing pitch including means for varying the spacing between said first and second critical points for changing the harmonic tuning, wherein the improvement comprises that each of said separate means for mounting each of said strings has a bridge element forming said second critical point and a string tensioning means on opposite side of said bridge element from said first critical disposed in a variably spaced relation to said second critical point over which each of said string extends*, wherein said string tensioning means includes a tailpiece*.

5. *Tuning apparatus for a stringed musical instrument comprising a body and a neck extending outwardly from said body, a plurality of strings extending from said body to said neck, means for forming a first critical point for each of said strings on said neck, means for forming a second critical point for each of said strings on a fulcrum tremolo, said fulcrum tremolo includes a base plate, said base plate being pivotally mounted about a fulcrum axis extending transversely of said strings for changing the pitch of all said strings at one time as said base plate is pivoted, separate means for mounting each of said strings on said base plate and for raising and adjusting the tension of said strings from an untensioned condition to a proper playing pitch including means for varying the spacing between said first and second critical points for changing the harmonic tuning, wherein the improvement comprises that each of said separate means for mounting each of said strings has a bridge element forming said second critical point and a string tensioning means on opposite side of said bridge element from said first critical point disposed in a variably spaced relation to said second critical point over which each of said string extends,*

*wherein said separate means has a sleeve-like member, said sleeve-like member has a first portion closer to said second critical point and a second portion more remote from said second critical point, said sleeve-like member includes a restricted interior portion between said first and second ends thereof, said string tensioning means has a first end closer to said bridge element and a second end more remote from said bridge element, said string tensioning means is displaceable between a first limiting position and a second limiting position and the first end of said string tensioning means is in spaced relation from said bridge element in and between said first and second limiting positions,*

*wherein string tensioning means has a string passageway extending from the first end thereof toward the second end, said string arranged to extend through said string passageway and secured to said string tensioning means at said second end,*

*wherein said string tensioning means has a threaded portion extending in the direction of the first end from said second end of said string tensioning means, said string tensioning means has a string clamping means extending from said first end of said string tensioning means towards said threaded portion, and said string tensioning displacement means comprising an bolt-like member adjustably mounted in said separate means and arranged to threadedly engage said string tensioning means for displacing said string tensioning means between said first and second limiting positions, and*

*wherein said string clamping means has a fork-like slotted string passageway extending from said threaded portion to said first end of said string tensioning means, said string clamping means including a clamping point at first end of said string tensioning means, said fork-like slotted string passageway has a lower fork closer to said base plate and an upper fork more remote from said base plate, said string clamping means has a annular flange-like portion in bearing contact with said restricted interior portion of said sleeve-like member, said string arranged to extend through said string passageway between said upper and lower forks, wherein as said string tensioning means is displaced in and between said first and second limiting positions for macro-tuning said string, said upper and lower forks are simultaneously displaced towards said string within said restricted interior portion for anchoring said string at said clamping point.*

14. A tuning apparatus for a stringed musical instrument, a plurality of strings extending over said stringed musical instrument, each of said strings having a first end and a second end, each of said first end of said strings having a first anchoring means on a first section of said stringed musical instrument and each of said strings having a second anchoring means on a second section of said stringed musical instrument, separate means for raising and adjusting the tension of at least one string from an untensioned condition to a tuned pitched condition, wherein the improvement comprises that said separate means has a string securing means including said first anchoring means for macro-tuning said at least one string*, wherein said separate means for raising and adjusting the tension includes a tailpiece*.

17. *A tuning apparatus for a stringed musical instrument, a plurality of strings extending over said stringed musical instrument, each of said strings having a first end and a second end, each of said first end of said strings having a first anchoring means on a first section of said stringed musical instrument and each of said strings having a second*

*anchoring means on a second section of said stringed musical instrument, separate means for raising and adjusting the tension of at least one string from an untensioned condition to a tuned pitched condition, wherein the improvement comprises that said separate means has a string securing means including said first anchoring means for macro-tuning said at least one string,*

*wherein said string securing means has a first end closer to said second anchoring means and a second end further to said second anchoring means, said string securing means is displaceable between a first limiting position and a second limiting position and the first end of said string securing means is in spaced relation from said second anchoring means and in between said first and second limiting positions,*

*wherein each said separate means includes a sleeve-like member with a first section closer to said second anchoring means and a second section closer said second anchoring means, said first end of said string securing means has a string passageway closer to said second anchoring means extending in the direction between said first and second ends thereof, said string securing means has a threaded portion further from said second anchoring means extending in the direction between said first and second ends thereof, and said string securing displacement means comprising an bolt-like member adjustably mounted in said sleeve-like member and arranged to threadedly engage said string securing means for displacing said string securing means in and between said first and second limiting positions, and* said sleeve-like member has a first slot arranged in said first section thereof, a first side of said sleeve-like member associated with said first slot, and string securing means has a fork-like string passageway extending from said first end thereof towards said second end of said string securing means, said fork-like string passageway means has a upper fork closer to said first slot and an lower fork more remote from said first slot, said upper fork has an unthreaded passageway transverse the direction of said fork-like passageway, said lower fork has a threaded passageway transverse the direction of said fork-like passagteway, said upper and lower forks are displaceable between an open position and a closed position.

21. *A tuning apparatus for a stringed musical instrument, a plurality of strings extending over said stringed musical instrument, each of said strings having a first end and a second end, each of said first end of said strings having a first anchoring means on a first section of said stringed musical instrument and each of said strings having a second anchoring means on a second section of said stringed musical instrument, separate means for raising and adjusting the tension of at least one string from an untensioned condition to a tuned pitched condition, wherein the improvement comprises that said separate means has a string securing means including said first anchoring means for macro-tuning said at least one string,*

*wherein said string securing means has a first end closer to said second anchoring means and a second end further to said second anchoring means, said string securing means is displaceable between a first limiting position and a second limiting position and the first end of said string securing means is in spaced relation from said second anchoring means and in between said first and second limiting positions,*

*wherein each said separate means includes a sleeve-like member with a first section closer to said second anchoring means and a second section closer said second anchoring means, said first end of said string securing means has a string passageway closer to said second anchoring means extending in the direction between said first and second ends thereof, said string securing means has a threaded portion further from said second anchoring means extending in the direction between said first and second ends thereof, and said string securing displacement means comprising an bolt-like member adjustably mounted in said sleeve-like member and arranged to threadedly engage said string securing means for displacing said string securing means in and between said first and second limiting positions, and* wherein said sleeve-like member includes a restricted portion between first and second section thereof, and string securing means has a string passageway extending from the first end thereof toward the second end, said string arranged to extend through said string passageway and secured to said string securing means, said string securing means includes a string clamping means, said string clamping means in and between said first and second ends of said string securing means, said string claimping means has a fork-like slotted string passageway extending from said threaded portion to said first end of said string securing means, said string clamping means including a clamping point at first end of said string securing means, said fork-like slotted string passageway has a first fork and second fork, said string clamping means has a annular flange-like portion in bearing contact with said restricted portion of said sleeve-like member, said string arranged to extend through said string passageway and between said first and second forks, wherein as said string clamping means is displaced in and between said first and second limiting positions said first and second forks are displaced within said restricted portion of said sleeve-like member for securely clamping said string at said clamping point.

* * * * *